(12) United States Patent
Griesbach et al.

(10) Patent No.: US 11,501,587 B2
(45) Date of Patent: Nov. 15, 2022

(54) ELECTRONIC ACCESS SYSTEM AND METHOD FOR RETROFITTING AN ELECTRONIC ACCESS SYSTEM

(71) Applicant: Southco, Inc., Concordville, PA (US)

(72) Inventors: Douglas John Griesbach, Chadds Ford, PA (US); Benjamin Lindo, Concordville, PA (US); Stephen Spatig, West Chester, PA (US); Kevin A. McCloskey, West Chester, PA (US)

(73) Assignee: Southco, Inc., Concordville, PA (US)

( * ) Notice: Subject to any disclaimer, the term of this patent is extended or adjusted under 35 U.S.C. 154(b) by 114 days.

(21) Appl. No.: 16/972,246

(22) PCT Filed: Jun. 6, 2019

(86) PCT No.: PCT/US2019/035707
§ 371 (c)(1),
(2) Date: Dec. 4, 2020

(87) PCT Pub. No.: WO2019/236789
PCT Pub. Date: Dec. 12, 2019

(65) Prior Publication Data
US 2021/0327180 A1      Oct. 21, 2021

Related U.S. Application Data

(60) Provisional application No. 62/681,945, filed on Jun. 7, 2018.

(51) Int. Cl.
*G07C 9/00* (2020.01)
*G07C 9/20* (2020.01)
(Continued)

(52) U.S. Cl.
CPC ..... *G07C 9/00563* (2013.01); *G06K 7/10366* (2013.01); *G07C 9/20* (2020.01); *E05B 39/00* (2013.01); *E05B 57/00* (2013.01)

(58) Field of Classification Search
CPC .. G07C 9/00563; G07C 9/20; G07C 9/00896; G07C 9/00944; G06K 7/10366;
(Continued)

(56) References Cited

U.S. PATENT DOCUMENTS 4,003,227 A * 1/1977 Casey ................... E05B 13/002
                                                                70/14
5,170,907 A * 12/1992 Sakai ...................... E05G 1/005
                                                                220/325
(Continued)

FOREIGN PATENT DOCUMENTS

CN         102160090 A      8/2011
CN         102760316 A      10/2012
(Continued)

OTHER PUBLICATIONS

Digitus Biometrics, DB Dual-Lock, "Meet a New Standard in Server Cabinet Access Control: Dual Factor Authentication at the Cabinet Door" retrieved from internet Mar. 1, 2021, https://web.archive.org/web/20190205003626/http://www.digitus-biometrics.com/products/db-dual-lock/, 2 pages.
(Continued)

*Primary Examiner* — Brian E Miller
(74) *Attorney, Agent, or Firm* — RatnerPrestia

(57) ABSTRACT

An electronic access system and method utilizes a modular latch system and method. The modular latch system and method include a reader module and latch module. The reader module includes a user interface with one or more readers or devices for receiving input from a user, and sending the input to a controller. The latch module is configured for mounting to a closure that provides access to the secure area. The latch module can be operated in a stand-alone mode while detached from the reader module. Alternatively, the latch module can be releasably engaged to the reader module and operated in an assembled mode. The
(Continued)

modular system and method allow for engagement of the reader module to the latch module, disengagement of the reader module from the latch module, and engagement of an alternate reader module to the latch module for retrofitting the reader module with the alternate reader module.

44 Claims, 17 Drawing Sheets

(51) Int. Cl.
*G06K 7/10* (2006.01)
*E05B 39/00* (2006.01)
*E05B 57/00* (2006.01)

(58) Field of Classification Search
CPC ........ E05B 39/00; E05B 57/00; E05B 1/0092; E05B 17/226; E05B 63/0056; E05C 3/042; E05Y 2400/85
See application file for complete search history.

(56) References Cited

U.S. PATENT DOCUMENTS

| | | | | |
|---|---|---|---|---|
| 6,116,660 | A * | 9/2000 | Langkamp, Jr. | E05B 17/002 292/65 |
| 6,540,093 | B1 * | 4/2003 | Shumway | A47B 57/404 108/147.11 |
| 8,610,535 | B2 | 12/2013 | Hui | |
| 9,024,759 | B2 * | 5/2015 | Uyeda | E05B 47/026 340/542 |
| 9,163,437 | B1 * | 10/2015 | Lawrence | E05C 1/14 |
| 9,670,696 | B2 * | 6/2017 | Chong | G07C 9/00944 |
| 9,690,272 | B2 * | 6/2017 | Chin | H04W 4/80 |
| 10,122,138 | B2 * | 11/2018 | Uyeda | H01R 27/02 |
| 10,208,508 | B2 * | 2/2019 | Tien | G07C 9/00563 |
| 2004/0089035 | A1 * | 5/2004 | Ciezki | E05B 1/0092 70/208 |
| 2005/0035163 | A1 * | 2/2005 | French | F41C 33/045 224/912 |
| 2007/0240463 | A1 * | 10/2007 | Antonucci | E05B 1/0092 70/208 |
| 2010/0031714 | A1 * | 2/2010 | Brown | E05B 47/00 70/91 |
| 2011/0252843 | A1 * | 10/2011 | Sumcad | E05B 17/2084 70/91 |
| 2013/0241694 | A1 | 9/2013 | Sharma et al. | |
| 2017/0138092 | A1 * | 5/2017 | Frank | E05B 65/025 |
| 2021/0327180 | A1 * | 10/2021 | Griesbach | G07C 9/20 |

FOREIGN PATENT DOCUMENTS

| | | |
|---|---|---|
| CN | 102906361 A | 1/2013 |
| CN | 103279905 A | 9/2013 |
| FR | 2728614 A1 | 6/1996 |
| WO | 2009158181 A1 | 12/2009 |

OTHER PUBLICATIONS

International Preliminary Report on Patentability for International Application No. PCT/US2019/035707, dated Dec. 8, 2020, 7 pages.
International Search Report and Written Opinion for International Application No. PCT/US2019/035707, dated Sep. 18, 2019, 9 pages.
Southco, "H3-EM—Electronic Locking Swinghandle", retrieved from internet Mar. 1, 2021, https://www.southco.com/en-us/h3-em, 5 pages.
Chinese Office Action for Chinese Application No. 201980052578. 2, dated Apr. 28, 2022, with translation, 32 pages.

* cited by examiner

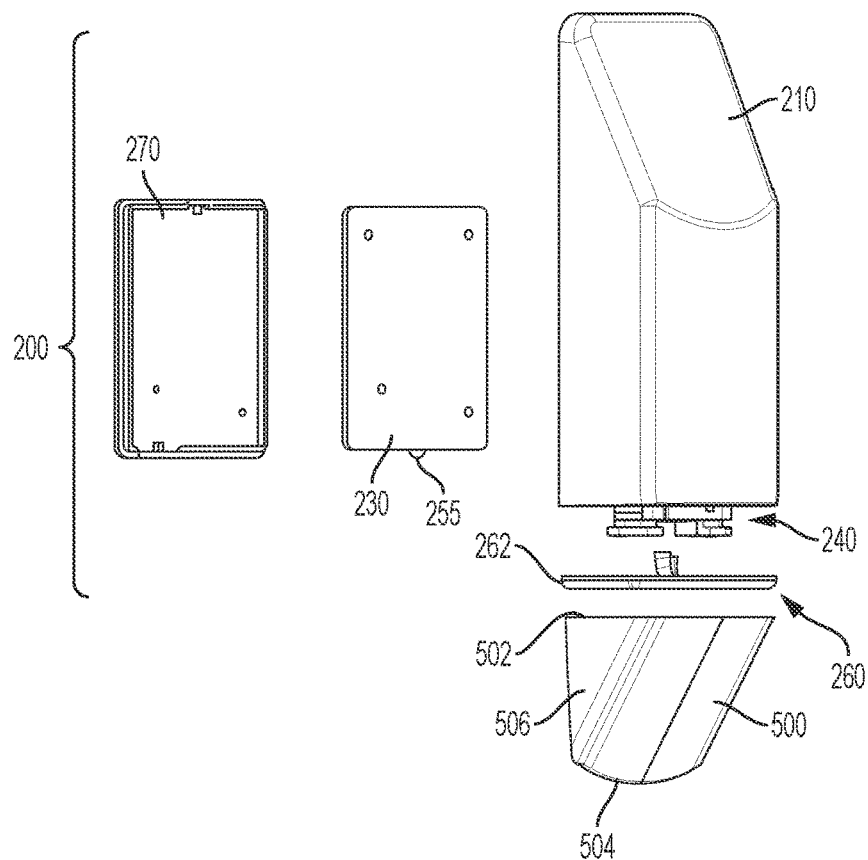
FIG. 15
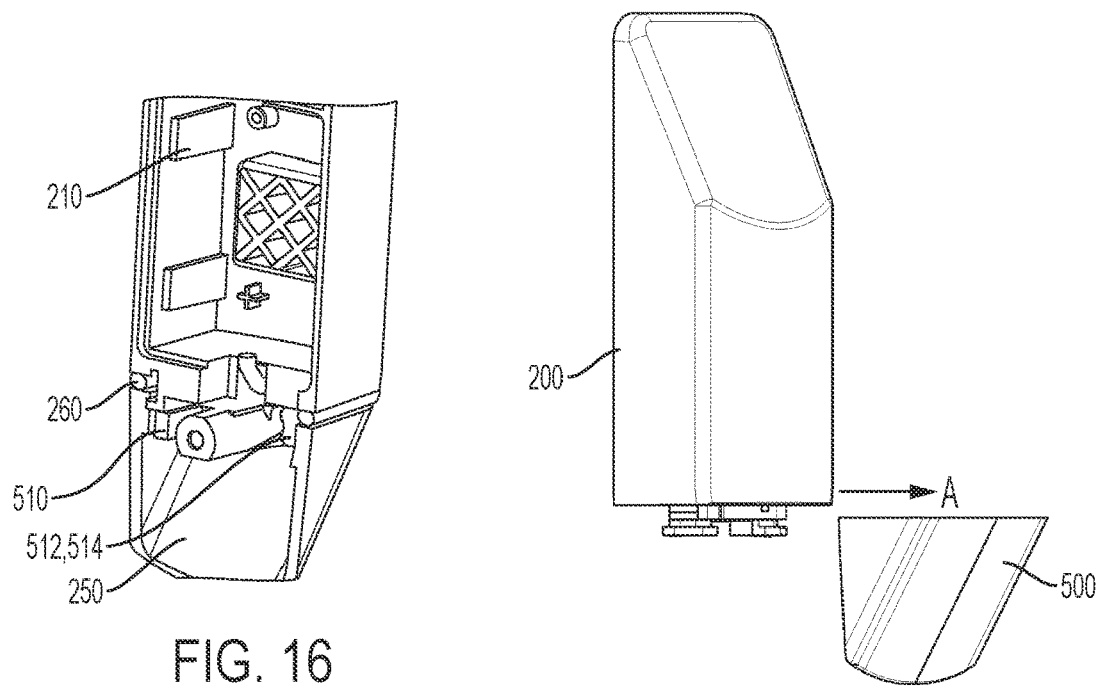
FIG. 16
FIG. 16A

ELECTRONIC ACCESS SYSTEM AND METHOD FOR RETROFITTING AN ELECTRONIC ACCESS SYSTEM

CROSS-REFERENCE TO RELATED APPLICATIONS

This application is a U.S. national phase application filed under 35 U.S.C. § 371 claiming benefits to International Patent Application No. PCT/US 2019/035707, filed Jun. 6, 2019, which is related to, and claims the benefit of priority of U.S. Provisional Application No. 62/681,945, entitled ELECTRONIC ACCESS SYSTEM AND METHOD FOR RETROFITTING AN ELECTRONIC ACCESS SYSTEM, filed on 7 Jun. 2018, the contents of which are incorporated herein by reference in their entirety for all purposes.

FIELD

The present disclosure relates generally to systems for providing controlled access to a secure area, and more specifically to electronic access systems and methods utilizing modular components that are interchangeable for modifying, upgrading and retrofitting existing installations.

BACKGROUND

Electronic access systems are used to control access to secured areas, including but not limited to data centers, research labs, vaults, storage areas, and other types of enclosures. Some systems feature one or more latches, where each latch facilitates the unlocking and locking of a panel, door or other structure that controls access to the secured area. These latches sometimes include built-in user interfaces, or "readers", that receive an input from a user seeking to access the secure area. Depending on the type of input, the input may be converted to a signal and sent to a controller. If the user's input is accepted, the controller will send a signal to unlock each latch.

Latches with built-in readers provide an effective way to control access to a secured area. However, they are not ideal in systems where changes are expected. Security measures are frequently evaluated and changed in response to an event such as a security breach, an improvement in technology, or a change in company policy or procedure. Changes to an existing access system can include changing the type of user input that is acceptable for access to a secured area. If the built-in reader is not designed to receive the newly chosen type of user input, then every latch and reader must be removed and replaced with a different latch and reader that accepts the newly chosen user input. This inflexibility can make it more difficult and costly for companies and agencies to implement changes to their electronic access system.

SUMMARY

The drawbacks of conventional security latches and electronic access systems are resolved in many respects by modular latch systems and methods, and electronic access systems and methods, in accordance with the present disclosure.

In one embodiment, a modular latch system for use in an electronic access system includes a reader operable to communicate electronically with a controller of the electronic assess system. The reader can include at least one user interface operable to receive at least one input from a user, and to communicate the at least one input to the controller. The system can also include a latch separate from and independently operable with respect to the reader. The latch can be configured for mounting to a closure that provides access to the secure area. The latch can also be configured to be releasably engaged to the reader. The system can be configured for releasable engagement of the reader to the latch, disengagement of the reader from the latch, and releasable engagement of an alternate reader to the latch for retrofit of the reader with the alternate reader.

In the same or different embodiment, the latch can be operable in a locked mode to lock the closure and prevent access to the secure area, and an unlocked mode to unlock the closure and allow access to the secure area.

In the same or different embodiment, the latch can be operable to receive an instruction from the controller and move the latch to one of the locked mode and the unlocked mode in response to the instruction.

In the same or different embodiment, the reader comprises a reader coupling and the latch comprises a latch coupling that is detachably connectable to the reader coupling.

In the same or different embodiment, the reader can include a cap that is detachably connectable to the reader coupling.

In the same or different embodiment, the cap can slidingly engage the reader coupling.

In the same or different embodiment, the at least one user interface can be selected from the group consisting of an RFID reader, a keypad and a biometric sensor.

In the same or different embodiment, the at least one user interface can include an RFID reader and a keypad.

In the same or different embodiment, the at least one user interface can include an RFID reader and a biometric sensor.

In the same or different embodiment, the latch can include a handle having a housing portion and a handle portion connected to the housing portion.

In the same or different embodiment, the housing portion can define the latch coupling.

In the same or different embodiment, the system can include a light source operable to emit light in response to an instruction from the controller.

In the same or different embodiment, the reader can be interchangeable with the alternate reader, and the alternate reader can be operable to communicate electronically with the controller. Moreover, the alternate reader can include at least one alternate user interface, the at least one alternate user interface being different from the at least one user interface.

In another embodiment, an electronic access system for providing controlled access to a secure area includes a controller and a modular latch system. The modular latch system can include a reader operable to communicate electronically with a controller of the electronic assess system. The reader can include at least one user interface operable to receive at least one input from a user, and to communicate the at least one input to the controller. The system can also include a latch separate from and independently operable with respect to the reader. The latch can be configured for mounting to a closure that provides access to the secure area. The latch can also be configured to be releasably engaged to the reader.

In the same or different embodiment, the modular latch system can be configured for engagement of the reader to the latch, disengagement of the reader from the latch, and engagement of an alternate reader to the latch for retrofit of the reader with the alternate reader.

In the same or different embodiment, the latch can be operable in a locked mode to lock the closure and prevent access to the secure area, and an unlocked mode to unlock the closure and allow access to the secure area.

In the same or different embodiment, the latch can be operable to receive an instruction from the controller and move the latch to one of the locked mode and the unlocked mode in response to the instruction.

In the same or different embodiment, the reader can include a reader coupling and the latch can include a latch coupling that is detachably connectable to the reader coupling.

In the same or different embodiment, the reader can include a cap that is detachably connectable to the reader coupling.

In the same or different embodiment, the at least one user interface can be selected from the group consisting of an RFID reader, a keypad and a biometric sensor.

In the same or different embodiment, the at least one user interface can include an RFID reader and a keypad.

In the same or different embodiment, the at least one user interface can include an RFID reader and a biometric sensor.

In the same or different embodiment, the handle can include a housing portion and a handle portion connected to the housing portion.

In the same or different embodiment, the housing portion can define the latch coupling.

In the same or different embodiment, the system can include a light source operable to emit light in response to an instruction from the controller.

In the same or different embodiment, the reader can be interchangeable with the alternate reader, and the alternate reader can be operable to communicate electronically with the controller. Moreover, the alternate reader can include at least one alternate user interface, the at least one alternate user interface being different from the at least one user interface.

In another embodiment, a latch for use with a reader in an electronic access system includes a housing and a latch coupling associated with the housing. The latch can be detachably connectable to a reader coupling of the reader or to a cap. The latch can be configured for engagement to the reader or the cap, disengagement from the reader or the cap, and engagement to an alternate reader for retrofit of the reader or the cap with the alternate reader.

In the same or different embodiment, the latch can be operable in a locked mode to lock the closure and prevent access to the secure area, and an unlocked mode to unlock the closure and allow access to the secure area.

In the same or different embodiment, the latch can be operable to receive an instruction from the controller and move the latch to one of the locked mode and the unlocked mode in response to the instruction.

In the same or different embodiment, the latch can include a handle having a housing portion and a handle portion connected to the housing portion.

In the same or different embodiment, the housing portion can define the latch coupling.

In the same or different embodiment, the latch can include a light source operable to emit light in response to an instruction from a controller in the electronic access system.

In another embodiment, a reader for use with a latch in an electronic access system can include a housing and a reader coupling associated with the housing. The reader coupling can be detachably connectable to a latch coupling of the latch or to a cap. The reader can be configured for engagement to the latch or the cap, disengagement from the latch or the cap, and engagement to an alternate latch for retrofit of the latch or the cap with the alternate latch.

In the same or different embodiment, the reader can be operable to communicate electronically with a controller of the electronic assess system, the reader including at least one user interface operable to receive at least one input from a user, and to communicate the at least one input to the controller.

In the same or different embodiment, the at least one user interface can be selected from the group consisting of an RFID reader, a keypad and a biometric sensor.

In the same or different embodiment, the at least one user interface can include an RFID reader and a keypad.

In the same or different embodiment, the at least one user interface can include an RFID reader and a biometric sensor.

In another embodiment, a method for retrofitting an electronic access system from a user interface to an alternate user interface can include the steps of: (1) disengaging a reader of the electronic access system from a latch of the electronic access system that is releasably engaged to the reader such that the reader and the latch are disengaged from one another; and (2) engaging an alternative reader having the alternate user interface to the latch of the electronic access system such that the alternative reader and the latch are releasably engaged to one another, thereby retrofitting the electronic access system from the user interface to the alternate user interface.

In the same or different embodiment, a method includes the step of engaging the reader of the electronic access system having the user interface to the latch of the electronic access system, wherein the reader comprises a reader coupling associated with the reader that is engaged to a latch coupling associated with the latch.

In the same or different embodiment, the reader coupling can be slidably engaged with the latch coupling.

In the same or different embodiment, the step of disengaging the reader of the electronic access system from the latch of the electronic access system can include disengaging a reader coupling associated with the reader from a latch coupling associated with the latch.

In the same or different embodiment, the reader coupling can be slidably disengaged from the latch coupling.

In another embodiment, a light pipe for a modular latch assembly can include a main body portion and an extension extending from the main body portion. The extension can include an inlet end for receiving light from a light source and transmitting the light through the extension to the main body portion.

BRIEF DESCRIPTION OF THE DRAWINGS

The foregoing summary and the following description will be better understood in conjunction with the non-limiting examples shown in the drawing figures, of which:

FIG. 15 is an exploded perspective view of the reader module of FIG. 8 with an optional cap;

FIG. 16 is a rear perspective view of the reader module of FIG. 8, with components removed for clarity;

FIG. 16A is a perspective view of the reader module of FIG. 8 and the cap of FIG. 15, showing the manner in which the reader module can be detachably coupled to the cap in a sliding manner;

DETAILED DESCRIPTION

Figure 1:
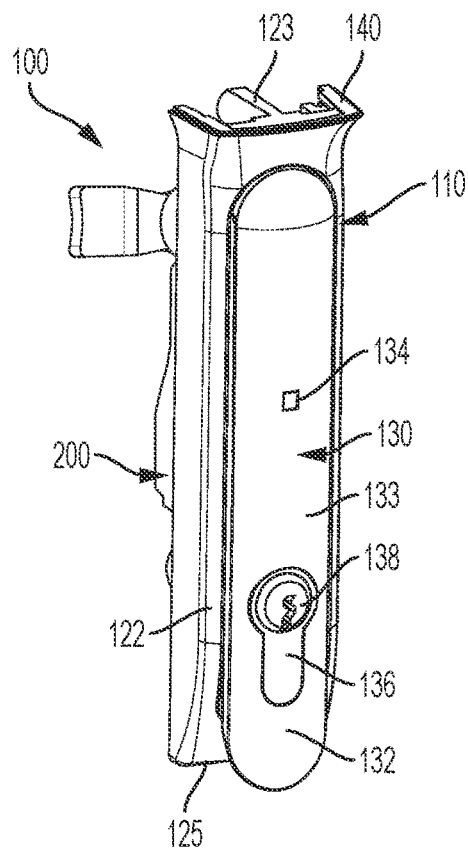
FIG. 1 is a perspective view of a latch module in accordance with one exemplary embodiment of the present disclosure.
Figure 2:
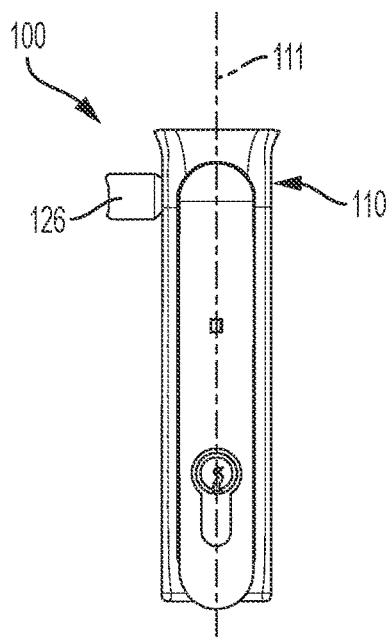
FIG. 2 is a front view of the latch module of FIG. 1.

Although the present disclosure describes and illustrates specific embodiments, the present disclosure is not intended to be limited only to the details and arrangements shown. Various modifications may be made to the details and arrangements shown in the present disclosure, and the full range of equivalents, without departing from the scope of the present disclosure.

The present disclosure describes modular latch systems and methods, and electronic access systems and methods that utilize modular latch systems and methods. Systems and methods of the present disclosure can include one or more latch modules. Systems and methods of the present disclosure can also include one or more reader modules. Reader modules can be releasably engaged, or detachably coupled, to latch modules, and vice versa. In systems and methods that utilize more than one reader module, each reader module can be interchangeable with any other reader module. That is, any latch module coupled to a first reader module can be retrofit with a second reader module which is different from the first reader module. Retrofitting can be carried out by disengaging the first reader module from the latch module, and engaging the second reader module to the latch module. In this way, the reader technology used in the electronic access system can be upgraded or otherwise modified without modifying or replacing the latch.

The term "latch module", as used herein, means a latch that can operate either in a "stand alone mode" or in an "assembled mode". A "stand alone mode", when used in reference to a latch module, is a mode in which the latch module is installed without a reader module detachably coupled to it. An "assembled mode", when used in reference to a latch module, is a mode in which the latch module is installed with a reader module detachably coupled to it.

The term "reader module", as used herein, means a reader that can operate either in a "stand alone mode" or in an "assembled mode". A "stand alone mode", when used in reference to a reader module, is a mode in which the reader module is installed without a latch module detachably coupled to it, such as where the reader module is installed with no attachment, or installed with a cap as will be described. An "assembled mode", when used in reference to a reader module, is a mode in which the reader module is installed with a latch module detachably coupled to it.

Referring to FIGS. 1-7, a latch module 100 is shown in accordance with one embodiment of the present disclosure. Latch module 100 is configured for mounting to a closure that provides access to a secure area. Once installed, latch module 100 is operable in two different modes to control access to the secure area. In particular, latch module 100 is operable in a locked mode to lock a closure and prevent access to the secure area. Latch module 100 is also operable in an unlocked mode to unlock the closure and allow access to the secure area. Latch module 100 is further operable to receive an instruction from a controller to switch to one of the locked mode and the unlocked mode in response to the instruction.

Latch module 100 includes a handle 110 having an elongated body that defines a longitudinal axis 111. Handles in accordance with the present disclosure may take the form of a swing handle or other type of handle which can be manually operated to open and close the closure. Handle 110 has a housing portion 120 and a handle portion 130. Housing portion 120 has a front side 122 and a rear side 124 opposite the front side. Handle portion 130, which is connected to front side 122 of housing portion 120, can be manually operated to open the closure when latch module 100 is in the unlocked mode.

Figure 3:
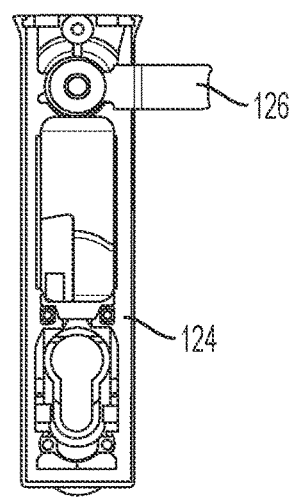
FIG. 3 is a rear view of the latch module of FIG. 1.
Figure 4:
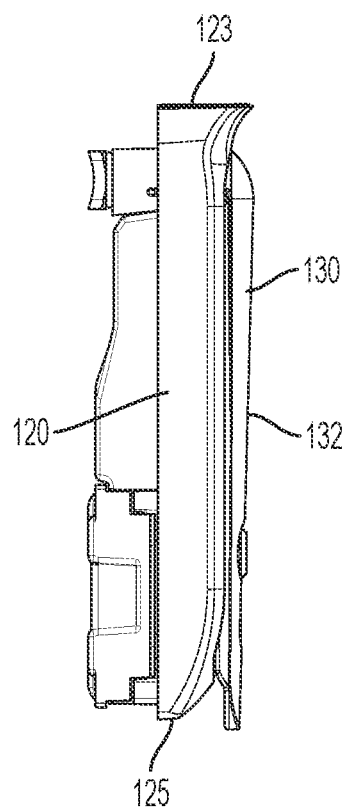
FIG. 4 is a left side view of the latch module of FIG. 1.
Figure 5:
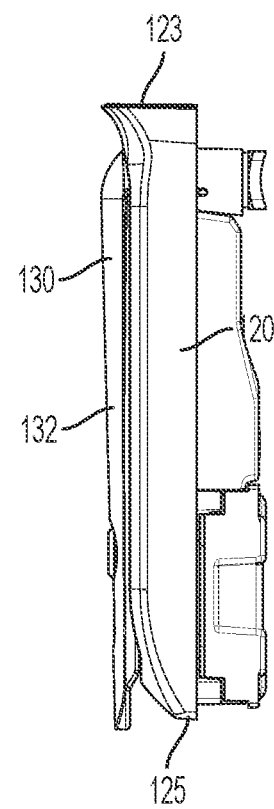
FIG. 5 is a right side view of the latch module of FIG. 1.
Figure 6:
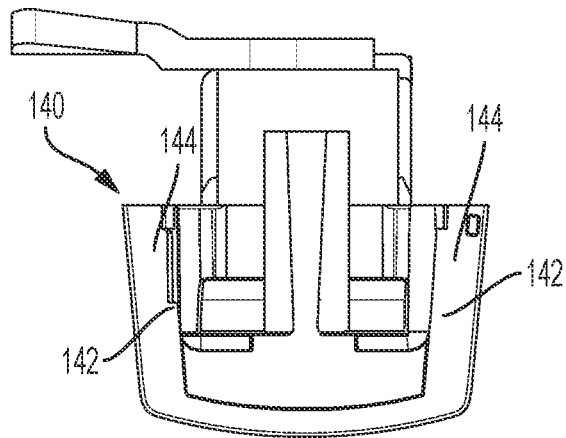
FIG. 6 is a top view of the latch module of FIG. 1.
Figure 7:
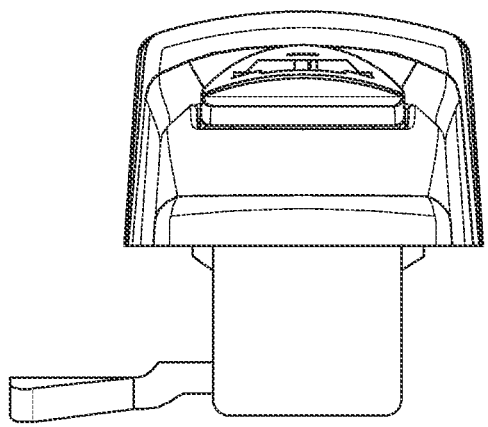
FIG. 7 is a bottom view of the latch module of FIG. 1.
Figure 8:
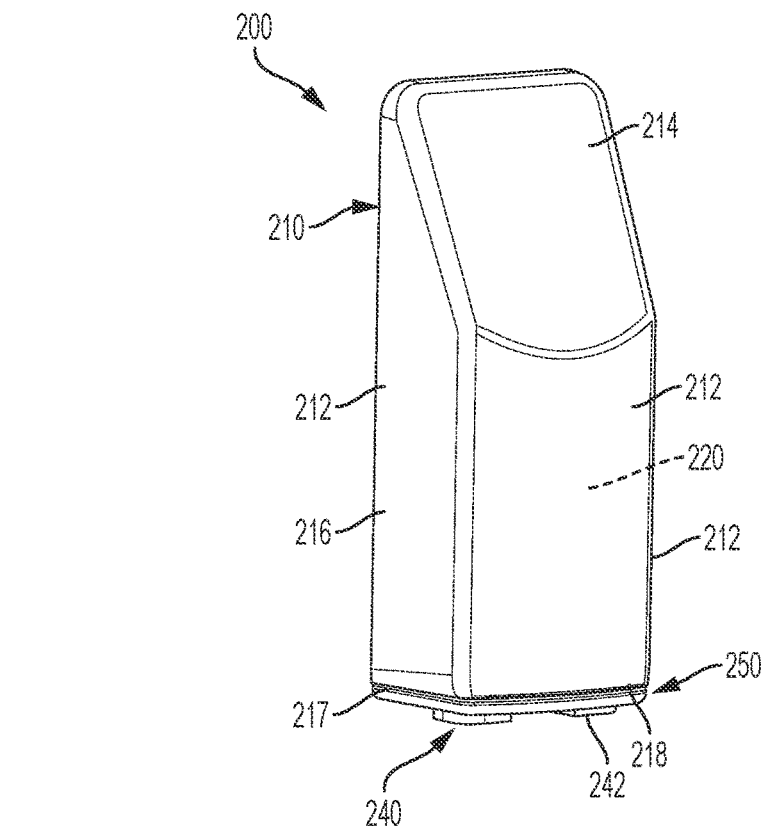
FIG. 8 is a perspective view of a reader module in accordance with one exemplary embodiment of the present disclosure.
Figure 9:
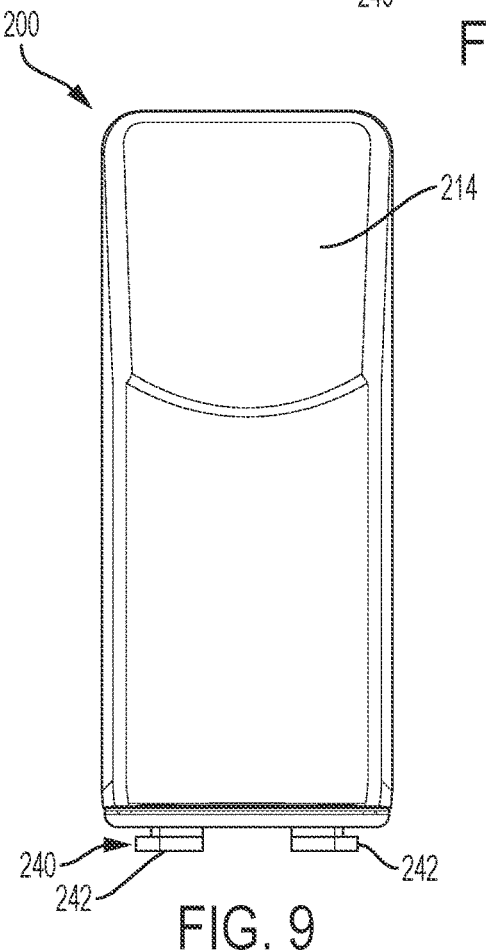
FIG. 9 is a front view of the reader module of FIG. 8.
Figure 10:
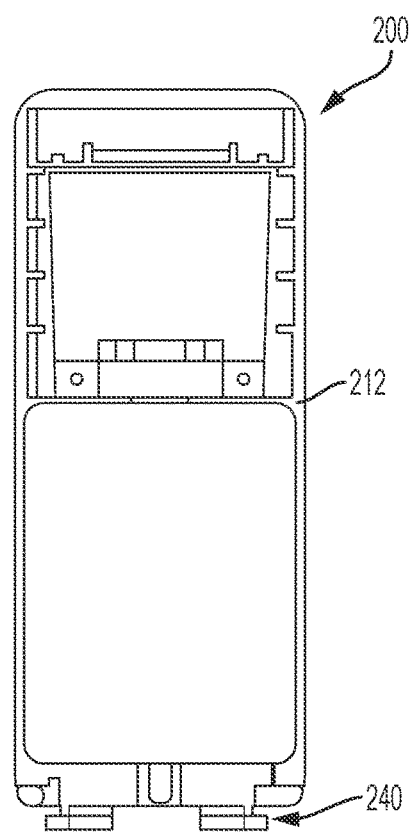
FIG. 10 is a rear view of the reader module of FIG. 8.
Figure 11:
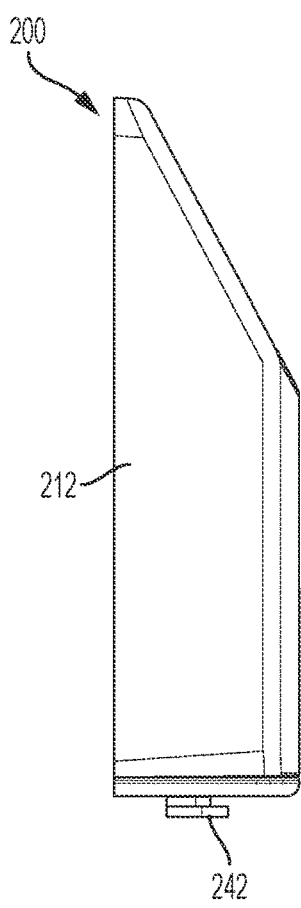
FIG. 11 is a left side view of the reader module of FIG. 8.
Figure 12:
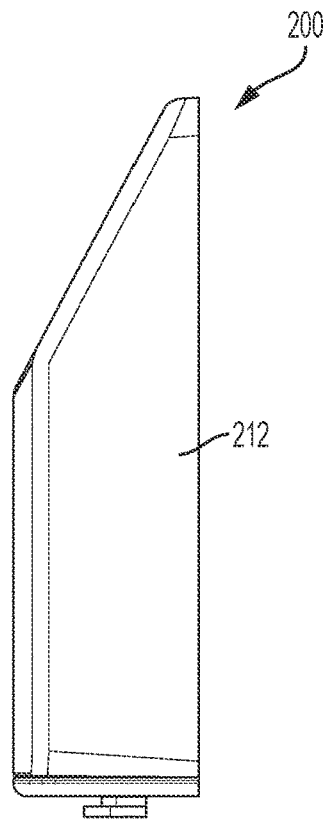
FIG. 12 is a right side view of the reader module of FIG. 8.
Figure 13:
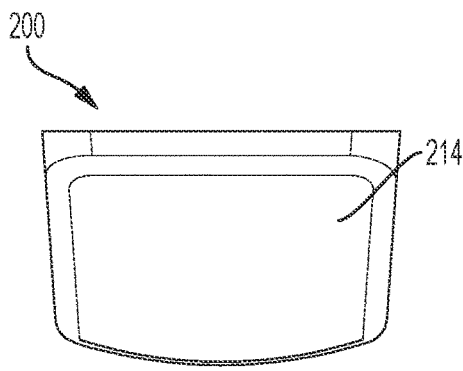
FIG. 13 is a top view of the reader module of FIG. 8.

A latch arm or pawl 126 is rotatably mounted to rear side 124 of housing portion 122. Pawl 126 is rotatable to a locked position when latch module 100 is in the locked mode, and an unlocked position when the latch module is in the unlocked mode. FIG. 3 shows pawl 126 in the locked position. Pawl 126 can be rotated ninety degrees from the locked position shown to an unlocked position.

Housing portion 120 also has a top portion 123 and a bottom portion 125 opposite the top portion. Top portion 123 defines a latch coupling 140. As will be explained, latch coupling 140 is configured to be releasably engaged to one or more different types of reader modules. Latch couplings in accordance with the present disclosure can include a variety of releasable connections. In the present example, latch coupling 140 includes a pair of longitudinal channels 142. Each channel 142 defines a slot 144 that opens toward longitudinal axis 111, such that the slots face one another.

Handle portion 130 comprises a lever 132 that can be manually operated to open the closure when latch module 100 is in the unlocked mode. Levers in accordance with the present disclosure can include a number of optional features and indicia that provide information about the operation of the latch module. In the present example, lever 132 has an LED light 134 that illuminates to provide a visual indication that power is being supplied to latch module 100.

Latch modules in accordance with the present disclosure can be unlocked in response to instructions received from a controller. In addition, latch modules in accordance with the present disclosure can optionally include one or more backup mechanisms for unlocking the latch modules. For example, latch modules in accordance with the present disclosure can include hasps for securing a standard or customized pad lock to the latch module. In addition, or as an alternative, latch modules in accordance with the present disclosure can include a key-type lock, such as card slot, chip reader, or mechanical lock cylinder, or other type of lock that reads or receives a key card or key. In the present example, lever 132 includes a key lock 136 on a front face 133 of the lever. Key lock 136, which is mechanically connected to pawl 126, is operable to rotate from a locked orientation to an unlocked orientation to move the pawl to the unlocked position. Key lock 136 includes a mechanical lock cylinder 138 adapted to receive a key to rotate the key lock to the unlocked orientation and thereby move the pawl to the unlocked condition. In this arrangement, key lock 136 can be used to unlock latch module 100 when the controller or other components of the electronic access system are disabled.

Latch modules in accordance with the present disclosure can be releasably engaged to one or more different reader modules. In addition, reader modules in accordance with the present disclosure can be configured to receive one or more types of user input from a user, and send that input to a controller in the electronic access system.

Referring to FIGS. 8-14, a reader module 200 in accordance with an embodiment of the present disclosure is shown. Reader module 200 includes a housing 210 having four sidewalls 212 and top face 214. Sidewalls 212 and top face 214 form a hollow enclosure 216. Enclosure 216 has a bottom end 217 that defines a bottom opening 218 opposite top face 214. Enclosure 216 also contains an RFID reader 220 that is operable to receive data from a user's RFID tag or transponder and send a signal to a controller. In this arrangement, reader module 200 requires single-factor authentication for access to a secure area.

Figure 14:
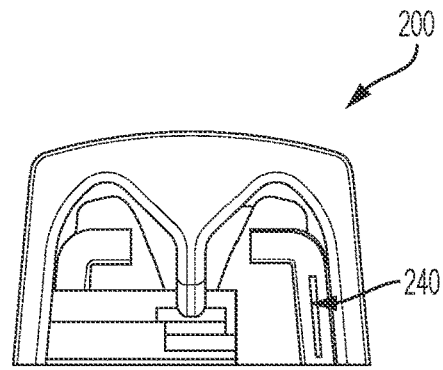
FIG. 14 is a bottom view of the reader module of FIG. 8.
Figure 14A:
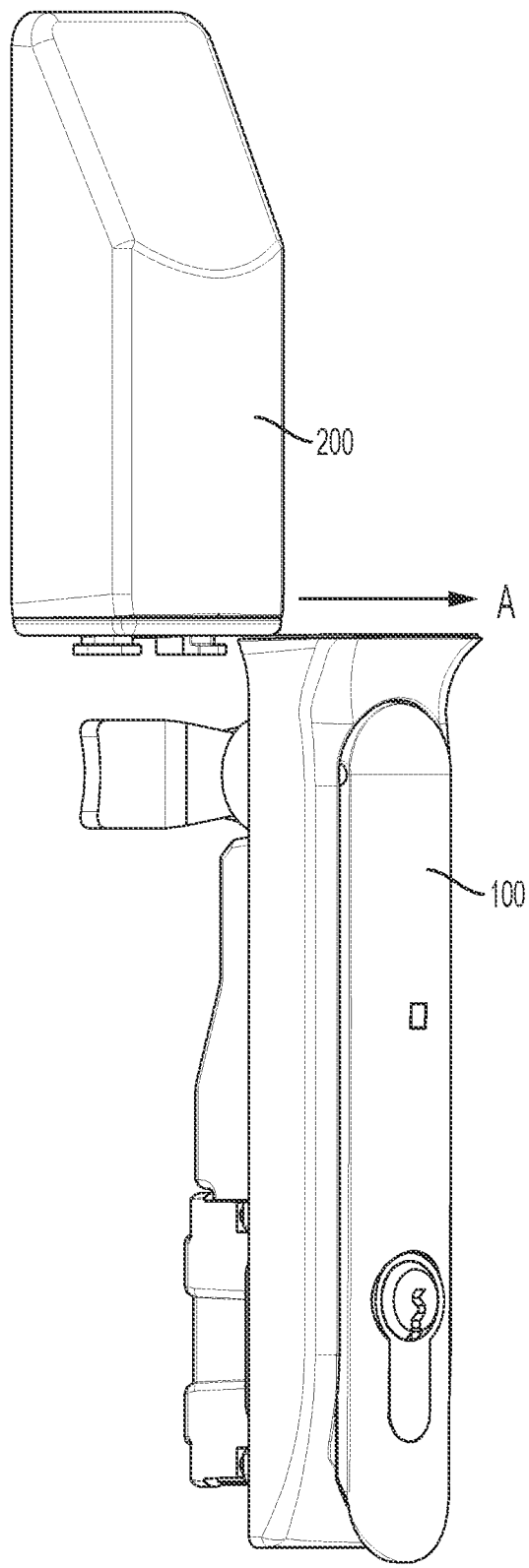
FIG. 14A is a perspective view of the latch module of FIG. 1 and the reader module of FIG. 8, showing the manner in which the reader module can be detachably coupled to the latch module in a sliding manner.
Figure 17:
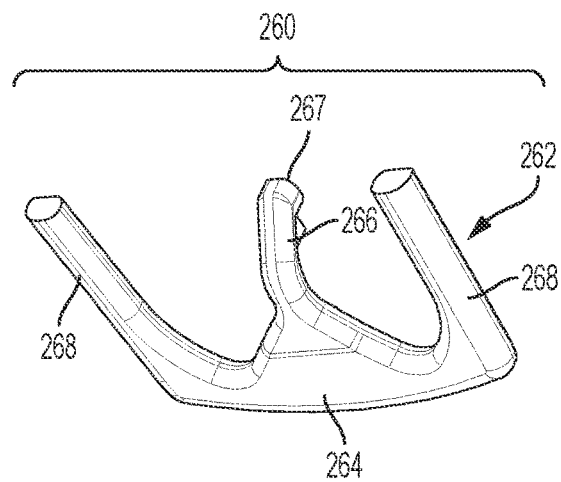
FIG. 17 is a perspective view of a light pipe component of the reader module of FIG. 8.
Figure 18:
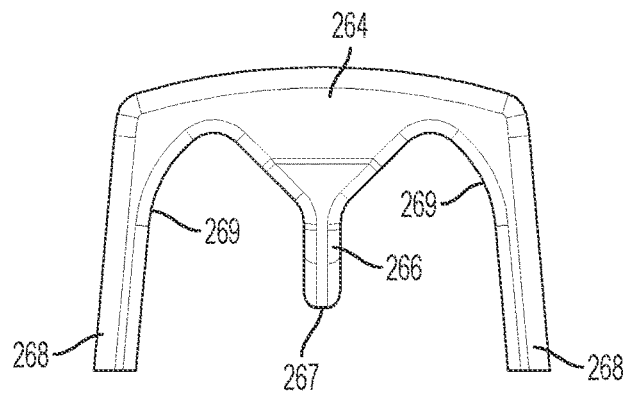
FIG. 18 is a plan view of the light pipe component of FIG. 17.

Reader modules in accordance with the present disclosure can have a variety of releasable connections for connecting to a latch module. In the present example, bottom end 217 of reader module 200 defines a reader coupling 240 configured to be releasably engaged to latch coupling 140 on latch module 100. Reader coupling 240 includes a pair of L-shaped rails 242. Rails 242 are configured to mate with and slidably engage channels 142 of latch coupling 140. In this arrangement, reader module 200 can be coupled to latch module 100 by axially aligning rails 242 with channels 142 and sliding the reader module onto the latch module in a linear sliding motion, as shown and marked by arrow "A" in FIG. 14A.

To couple reader module 200 to latch module 100, the rear side of the bottom end 217 of reader module 200 is placed in proximity to the top edge of the front side of latch module 100. Rails 242 on reader module 200 are then aligned with channels 142 on latch module 100. Once alignment is confirmed, the bottom end 217 of reader module 200 is advanced over the top end of latch module 100 in a linear motion, with the reader module moving toward the rear side of the latch module in a front-to-back or "engagement direction".

To remove reader module 200 from latch module 100, the reader module is moved relative to the latch module by linear motion toward the front side of the latch module, i.e. in a direction opposite the engagement direction, referred to as the "disengagement direction". As reader module 200 is moved in the disengagement direction relative to latch module 100, rails 242 slide along channels 142 until the rails exit the ends of the channels, at which point the reader module is removed from latch module.

Reader modules in accordance with the present disclosure may include one or more feedback mechanisms for communicating with a user. Feedback mechanisms in accordance with the present disclosure can be any type of mechanism that provides perceptible feedback, including but not limited to mechanisms that provide visible feedback, like LEDs that emit light of one or more wavelengths, or mechanisms that provide acoustic feedback, like piezoelectric speakers that provide audible beeps or other sounds.

Feedback mechanisms can be configured to communicate various types of information. For example, feedback mechanisms can communicate information about the operating status of the electronic access system, such as confirmation that the system is online, or an alert that the electronic access system is not online. Feedback mechanisms can also communicate information about the input received by the reader. For example, feedback mechanisms can inform a user that their input was recognized or not recognized by the controller.

In the present example, reader module 200 includes a feedback mechanism in the form of a "light pipe" assembly 250. Light pipe assembly 250 is operable to transmit one or more light signals on the exterior of reader 200, each light signal having different characteristics that distinguish it from other light signals. Light signal characteristics may include, but are not limited to, light duration, color, brightness/intensity, pattern and any combination thereof. Lights that provide signals through patterns may blink, fade, brighten and/or change color in a certain sequence. Each light signal is pre-defined to correspond to a specific operating parameter, condition, or response, providing a message to a user regarding that parameter, condition or response. A list of examples of light signals and corresponding messages is provided below in Table 1.

TABLE 1

Light Signals and Corresponding Messages

| Light Signal | Message |
| --- | --- |
| Continuous white light | System online |
| Continuous gray light | System offline |
| Blinking green light | User input recognized |
| Blinking red light | User input not recognized |

The light signals and messages listed in Table 1 are provided only as examples, and do not represent a complete list of light signals or messages that can be implemented in accordance with the present disclosure. Other light signals and messages can also be communicated to a user. Moreover, the light signals listed in Table 1 need not be associated with the corresponding message in Table 1, and vice versa, as other correlations can also be used in accordance with the present disclosure.

Referring to FIGS. 15-19, components of reader module 200 and light pipe assembly 250 are shown in more detail. Reader module 200 contains a circuit board 230 and a light source 255 which may be mounted to or wired to the circuit board. A back plate 270 is detachably connected to the rear sidewall 212 of housing 210 to provide access to circuit board 230. Light source 255 can be an LED light or other source of illumination. A light pipe 260 is mounted to light source 255 to distribute light from the light source to the exterior of housing 210. Light pipe 260 includes a clear solid body 262 having a main body portion 264. Body 262 includes a central extension 266 that is curved, and a pair of parallel side extensions 268. Central extension 266 has an inlet end 267 configured for placement immediately beneath light source 255 and receive light from the light source. In this arrangement, light pipe 260 transmits light emitted from light source 255 on the interior of reader 200 to the exterior of reader where it is visible to a user.

Figure 19:
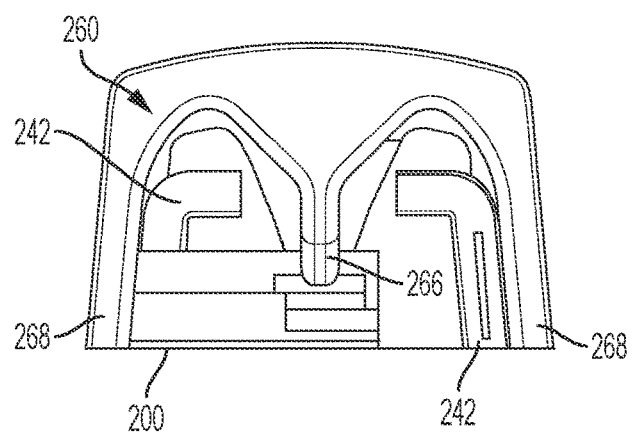
FIG. 19 is another bottom view of the reader module of FIG. 8 that is enlarged to more clearly show features of the reader module.
Figure 20:
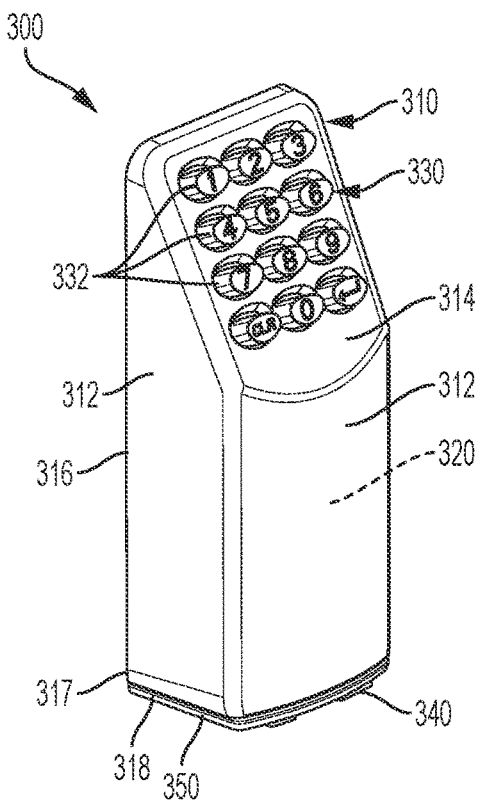
FIG. 20 is a perspective view of a reader module in accordance with another exemplary embodiment of the present disclosure.
Figure 21:
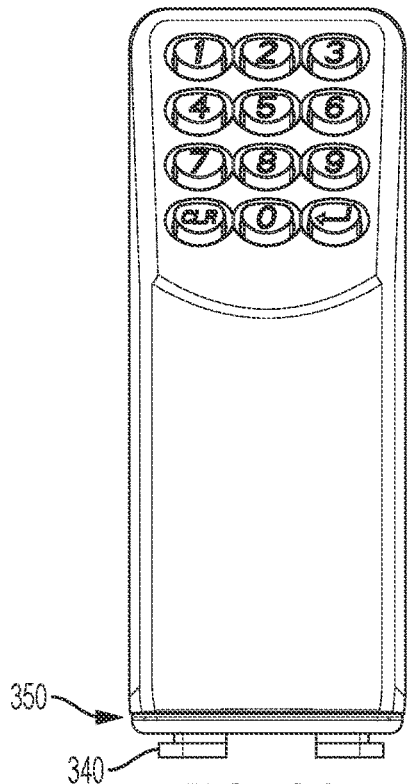
FIG. 21 is a front view of the reader module of FIG. 20.
Figure 22:
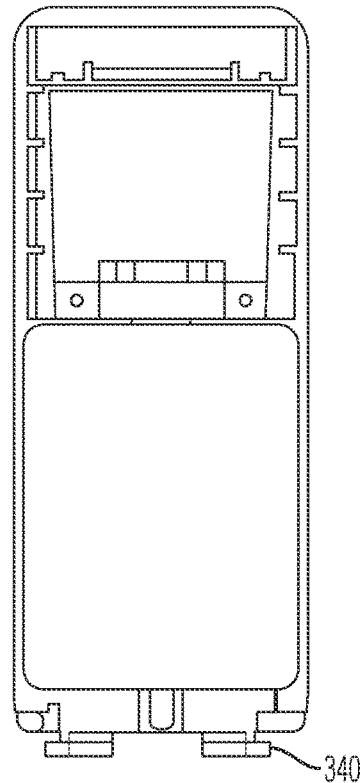
FIG. 22 is a rear view of the reader module of FIG. 20.
Figure 23:
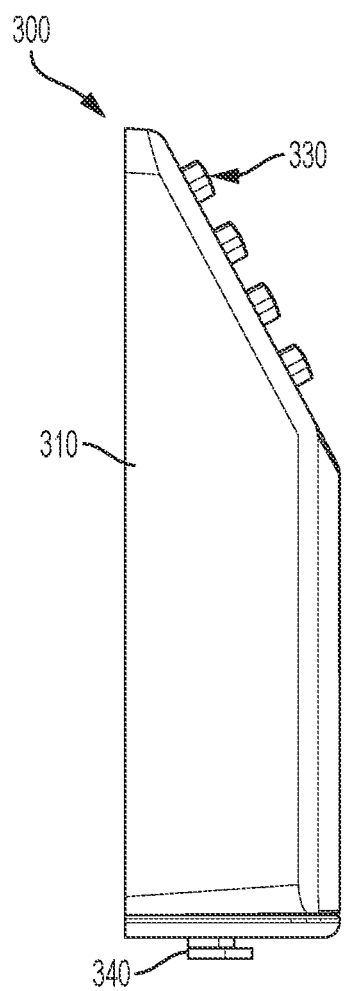
FIG. 23 is a left side view of the reader module of FIG. 20.
Figure 24:
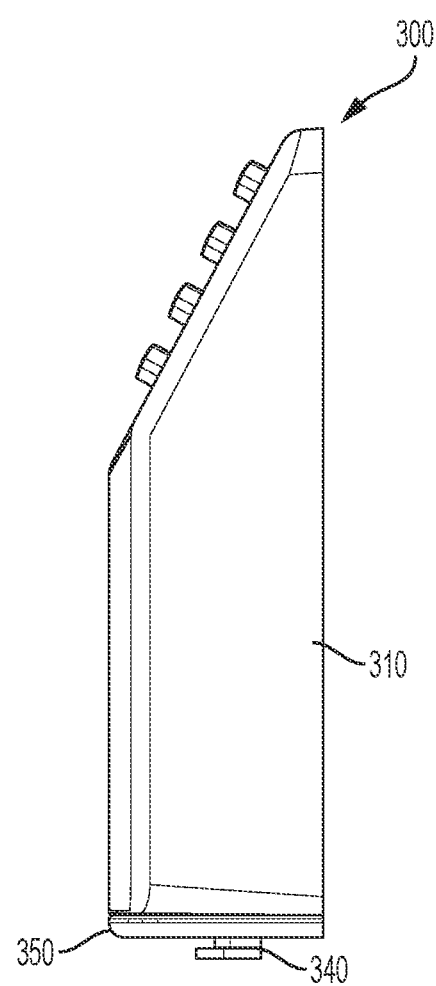
FIG. 24 is a right side view of the reader module of FIG. 20.
Figure 25:
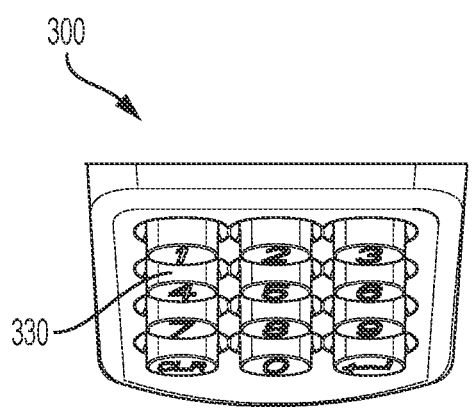
FIG. 25 is a top view of the reader module of FIG. 20.
Figure 26:
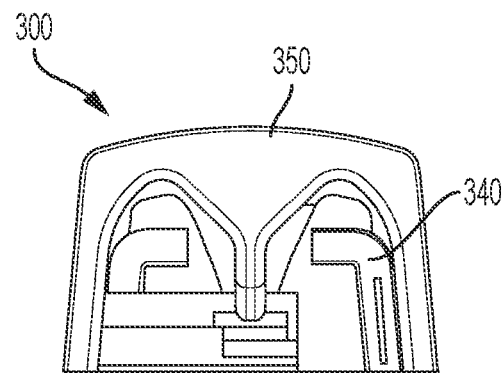
FIG. 26 is a bottom view of the reader module of FIG. 20.
Figure 27:
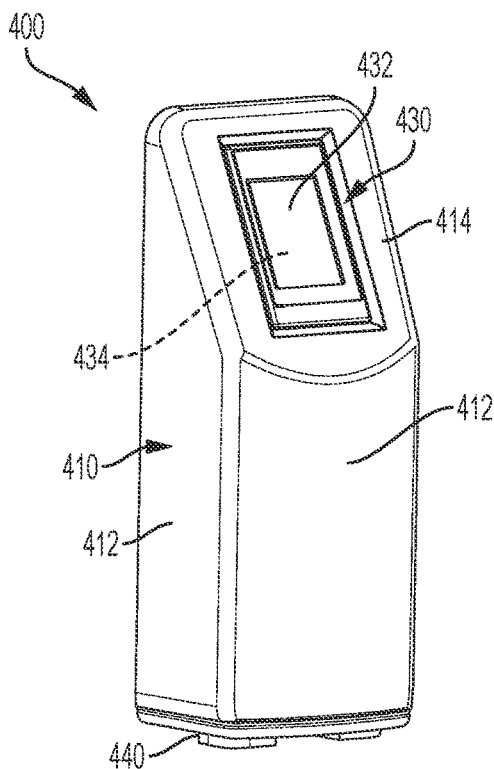
FIG. 27 is a perspective view of a reader module in accordance with another exemplary embodiment of the present disclosure.
Figure 28:
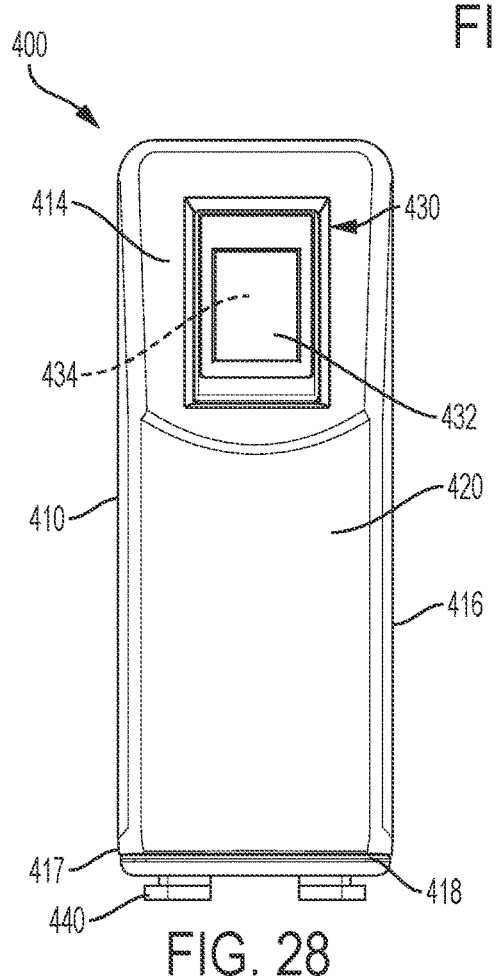
FIG. 28 is a front view of the reader module of FIG. 27.
Figure 29:
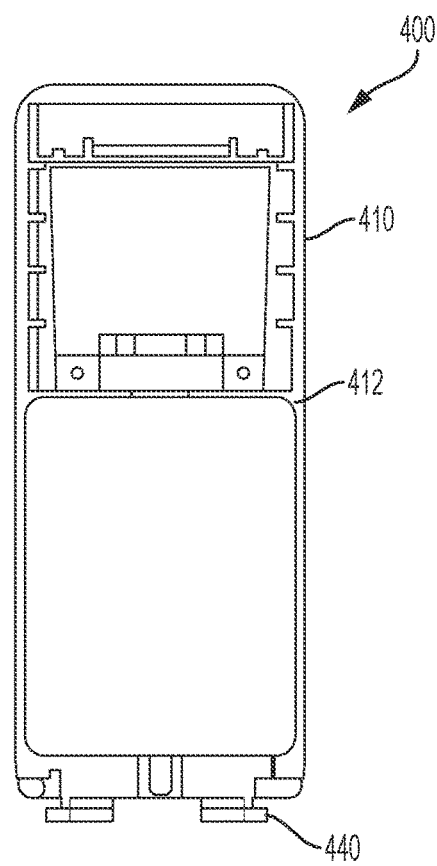
FIG. 29 is a rear view of the reader module of FIG. 27.
Figure 30:
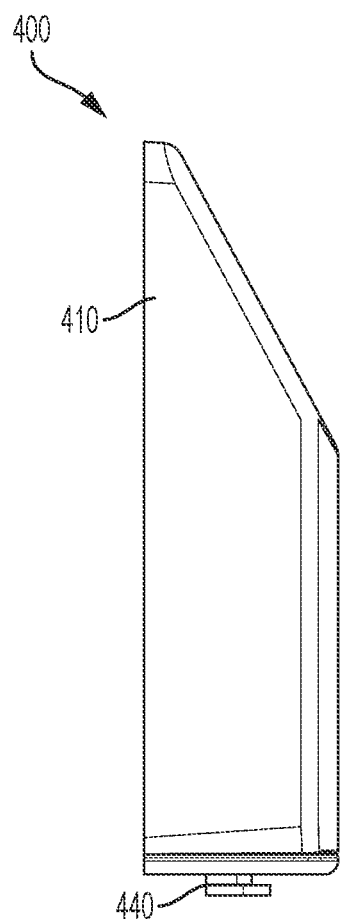
FIG. 30 is a left side view of the reader module of FIG. 27.
Figure 31:
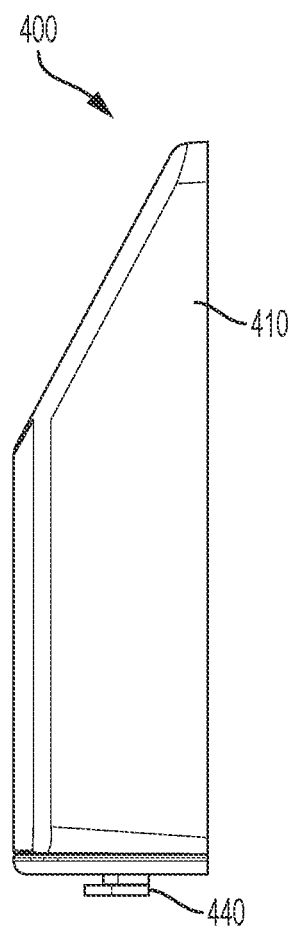
FIG. 31 is a right side view of the reader module of FIG. 27.
Figure 32:
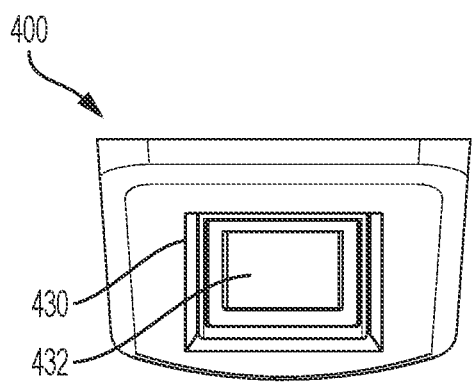
FIG. 32 is a top view of the reader module of FIG. 27.
Figure 33:
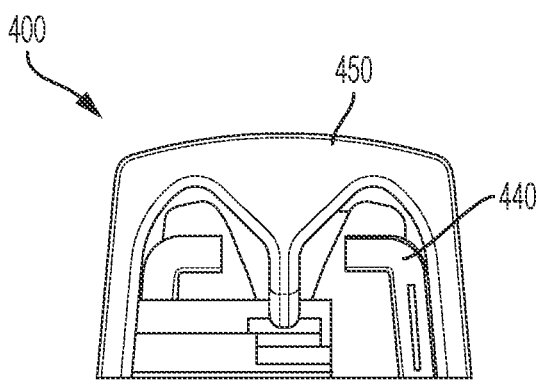
FIG. 33 is a bottom view of the reader module of FIG. 27.

Light pipe 260 has an "M"-shaped geometry formed by main body portion 264, central extension 266 and side extensions 268. With this geometry, light pipe 260 is configured for mounting around reader coupling 240 and onto the bottom end of reader 200, as shown in FIG. 19. Central extension 266 and side extensions 268 define a pair of symmetrical apertures 269. Apertures 269, which are on opposing sides of central extension 266, are shaped so that side extensions 268 fit snugly around rails 242. When light pipe 260 is mounted in this position, main body portion 264 is exposed on the front side of reader module 200, and side extensions 268 are exposed on the left and right sides of the reader module.

Reader module 200 is shown with an optional cover or cap 500 in FIGS. 15 and 16. Cap 500 is configured to be releasably engaged, or detachably coupled, to the reader coupling 240 of reader module 200 to conceal the reader coupling, while leaving light pipe 260 exposed on the exterior of the reader module. Cap 500 includes a top end 502, a bottom end 504 and sidewalls 506 that converge or taper toward one another as the sidewalls extend from the top end to the bottom end. Top end 502 includes a cap coupling 510 that functions in the same manner or similar manner as latch coupling 140 on latch module 100. In particular, cap coupling 510 includes a pair of longitudinal channels 512. Each channel 512 defines an inwardly-facing slot 514, such that the slots face one another. Channels 512 are configured to mate with and slidably engage rails 242 of reader coupling 240. In this arrangement, cap 500 can be coupled to reader module 200 by axially aligning channels 512 with rails 242 and sliding the cap onto the reader module in a linear sliding motion, as shown and marked by arrow "A" in FIG. 16A.

As noted previously, latch couplings in accordance with the present disclosure can be configured for releasable engagement with one or more different types of reader modules. Moreover, reader modules in accordance with the present disclosure can utilize one or more different types of user interfaces operable to receive input from a user. Various types of readers can be utilized independently or in combination on reader modules. For example, reader modules in accordance with the present disclosure can feature two different readers operable to receive two different forms of input from a user. These reader modules can be operated with one reader activated, and the other reader disabled, so as to require only single-factor authentication. Alternatively, the reader modules can be operated with both readers activated so as to require two-factor authentication.

Reader modules in accordance with the present disclosure can also feature three, four or more different readers that are operable to receive three or more different forms of input from a user. The number of different readers on a reader module can be selected for a desired level of security, for installations where procedures are expected to change frequently, or other design considerations. For reader modules with two or more readers, the readers can be operated in multiple different modes. In a first mode, for example, only one reader is activated for receiving an input for single-factor authentication. In a second mode, two or more readers are activated for receiving an input. When two or more readers are activated, the controller can be programmed to send a signal to unlock the latch module when at least one of the inputs is cleared (single-factor authentication) or alternatively, when two or more inputs are cleared (multi-factor authentication).

Referring now to FIGS. 20-26, a reader module 300 in accordance with another embodiment of the present disclosure is shown. Reader module 300 is identical to reader module 200 in many respects. Therefore, the following description of reader module 300 will focus on aspects that are different from, or completely absent from, reader module 200, with the understanding that reader module 300 can include the other features present on reader module 200 but not specifically described.

Reader module 300 includes a housing 310 having four sidewalls 312 and a top face 314. Sidewalls 312 and top face 314 form a hollow enclosure 316. Enclosure 316 has a bottom end 317 that defines a bottom opening 318 opposite top face 314. Reader module 300 contains an RFID reader 320 that is operable to receive data from a user's RFID tag or transponder and send a signal to a controller.

Unlike reader module 200, reader module 300 features a keypad 330 that is operable to receive a typed entry from a user. The term "keypad" is used generically herein to refer to any type of interface that allows a user to enter a passcode. For example, keypads in accordance with the present disclosure can be in the form of a plurality of discrete keys or buttons that project from the exterior of the reader. Alternatively, keypads in accordance with the present disclosure can appear on a touchscreen that contains images representing virtual keys or buttons. Keypads in accordance with the present disclosure can also include any number, arrangement and style of keys or buttons, as well as any type of identifiable indicia for entering passcodes, including but not limited to letters, numbers and symbols that are printed, embossed, etched or otherwise presented on the interface.

In the present example, keypad 330 includes a plurality of discrete buttons 332 that project from the surface of housing 310. Buttons 332 are configured to be depressed individually or in combination to enter a passcode. In this arrangement, RFID reader 320 and keypad 330 can provide two-factor authentication that requires a user to not only present an approved RFID tag or transponder, but also enter an approved passcode on the keypad in order to gain access to a secure area. Alternatively, reader module 300 can be operated in a mode that requires only single-factor authentication. For example, reader module 300 can be operated in a mode that grants access to a user if the user either presents an approved an RFID tag or transponder, or enters an approved passcode.

Reader module 300 includes a reader coupling 340 and light pipe assembly 350 with the same features as reader coupling 240 and light pipe assembly 250. Reader coupling 340 allows reader module 300 to be releasably engaged to latch module 100 or cap 500. Therefore, reader coupling 340 allows reader module 300 to be interchangeable with reader module 200. This allows a latch module 100 and reader module 200, in either stand-alone or assembled mode, to be retrofitted with reader module 300, in order to upgrade the assembly to two-factor authentication without removing, modifying or replacing the existing latch module. Similarly, a latch module 100 and reader module 300, operating in either a stand-alone or assembled mode, can be retrofitted with reader module 200 without removing, modifying or replacing the existing latch module.

Referring now to FIGS. 27-33, a reader module 400 in accordance with another embodiment of the present disclosure is shown. Reader module 400 is identical to reader module 200 in many respects. Therefore, the following description of reader module 400 will focus on aspects that are different from, or completely absent from, reader module 200, with the understanding that reader module 400 can include the other features present on reader module 200 but not specifically described on reader module 400.

Reader module 400 includes a housing 410 having four sidewalls 412 and a top face 414. Sidewalls 412 and top face 414 form a hollow enclosure 416. Enclosure 416 has a bottom end 417 that defines a bottom opening 418 opposite top face 414. Reader module 400 contains an RFID reader 420 that is operable to receive data from a user's RFID tag or transponder and send a signal to a controller.

Unlike reader module 200, reader module 400 features a biometric sensor in the form of a fingerprint scanner 430. Fingerprint scanner 430 is operable to scan a user's fingerprint, and send a corresponding signal to a controller. It will be understood that various fingerprint scanner configurations can be utilized in accordance with the present disclosure. It will also be understood that other types of biometric sensors can be used, and are therefore contemplated within the scope of the present disclosure, including but not limited to devices and components for scanning, measuring or detecting a user's handprint, thumbprint, retina, iris, face or other body feature.

In the present example, fingerprint scanner 430 includes a rectangular scanner pad 432 on top face 414 of reader module 400. Housing 410 contains a scanner 434 beneath scanner pad 432 that is operable to scan a user's finger. Scanner 434 may be any suitable scanner type, such as an optical scanner or a capacitive scanner. In this arrangement, RFID reader 420 and fingerprint scanner 430 can provide two-factor authentication that requires a user to not only present an approved RFID tag or transponder, but also scan an approved fingerprint in order to gain access to a secure area. As with reader module 300, reader module 400 can be operated in a mode that requires only single-factor authentication. For example, reader module 400 can be operated in a mode that grants access to a user if the user either presents an approved an RFID tag or transponder, or scans an approved fingerprint.

Reader module 400 includes a reader coupling 440 and light pipe assembly 450 with the same features as reader coupling 240 and light pipe assembly 250, respectively. Reader coupling 440 allows reader module 400 to be releasably engaged to latch module 100 or cap 500. Therefore, reader coupling 440 allows reader module 400 to be interchangeable with reader module 200 and reader module 300. This allows a latch module 100 and reader module 200, operating in either a stand-alone or assembled mode, to be retrofitted with reader module 400 to upgrade or modify the assembly without removing and replacing the existing latch module. Similarly, it allows a latch module 100 and reader module 300, operating in either a stand-alone or assembled mode, to be retrofitted with reader module 400 to upgrade or modify the assembly without removing and replacing the existing latch module. Moreover, an existing assembly featuring a latch module 100 and reader module 400, operating in either a stand-alone or assembled mode, can be retrofitted with either reader module 200 or reader module 300, without removing and replacing the existing latch module.

Figure 34:
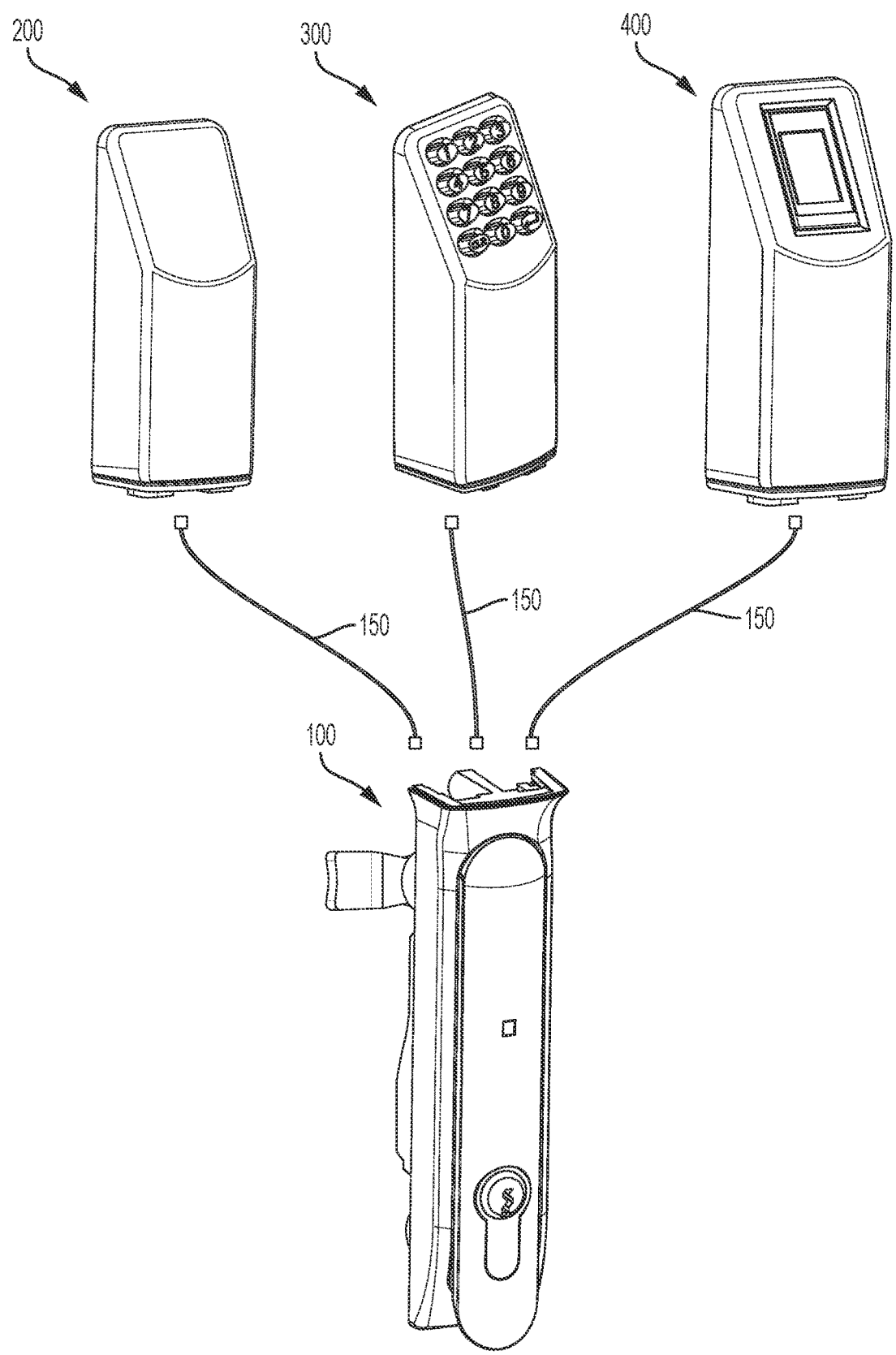
FIG. 34 is a partially exploded perspective view of the latch module of FIG. 1 and the reader modules of FIGS. 8, 20 and 27.
Figure 35:
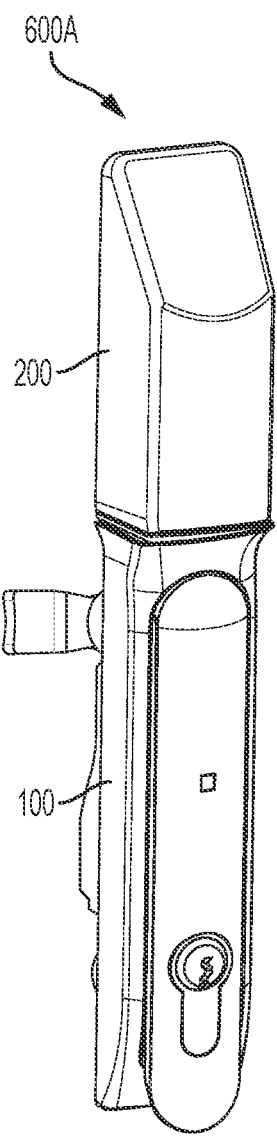
FIG. 35 is a perspective view of the latch module of FIG. 1 connected to the reader module of FIG. 8.
Figure 36:
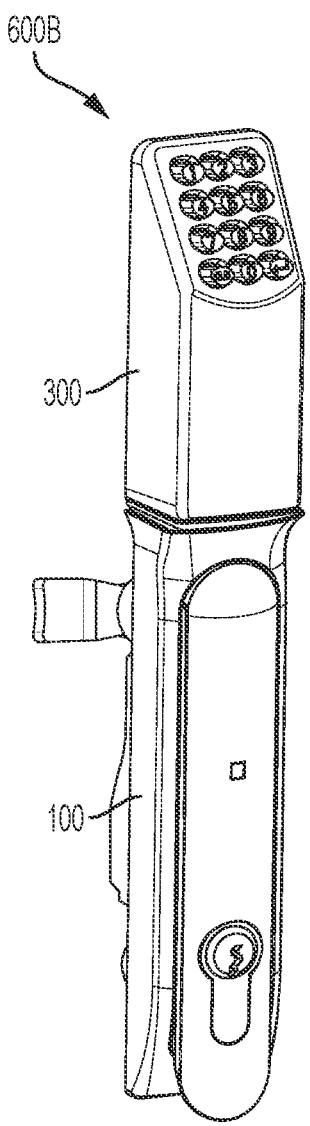
FIG. 36 is a perspective view of the latch module of FIG. 1 connected to the reader module of FIG. 20.
Figure 37:
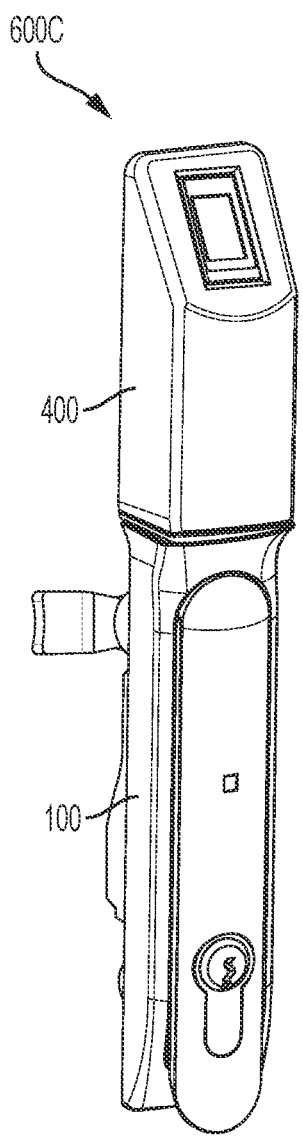
FIG. 37 is a perspective view of the latch module of FIG. 1 connected to the reader module of FIG. 27.
Figure 38:
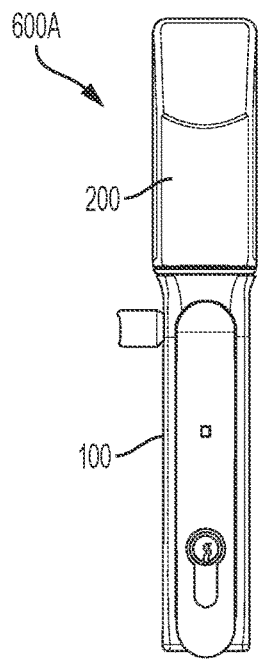
FIG. 38 is a front view of the latch module and reader module of FIG. 35.
Figure 39:
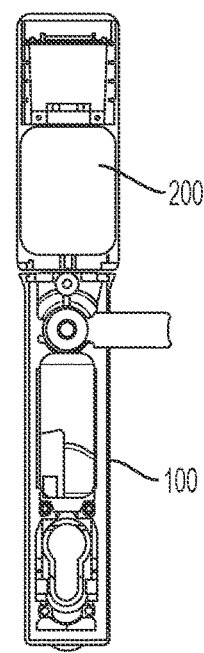
FIG. 39 is a rear view of the latch module and reader module of FIG. 35.
Figure 40:
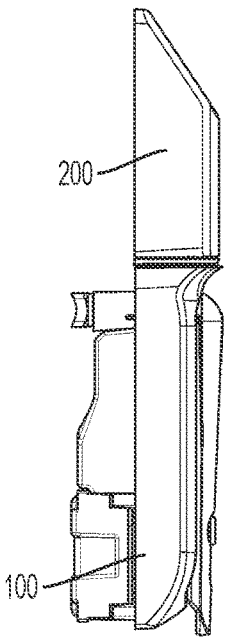
FIG. 40 is a left side view of the latch module and reader module of FIG. 35.
Figure 41:
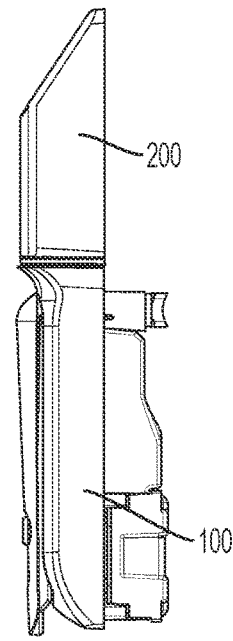
FIG. 41 is a right side view of the latch module and reader module of FIG. 35.
Figure 42:
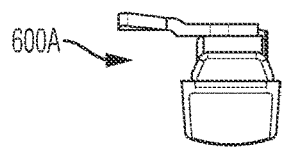
FIG. 42 is a top view of the latch module and reader module of FIG. 35.
Figure 43:
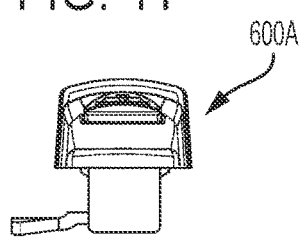
FIG. 43 is a bottom view of the latch module and reader module of FIG. 35.
Figure 44:
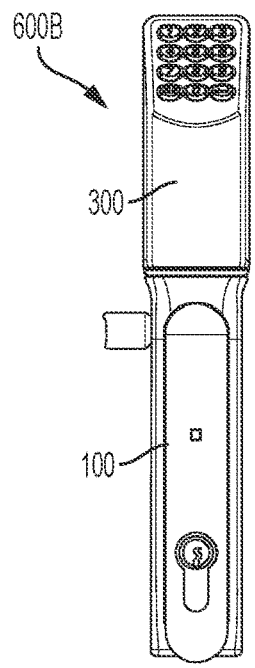
FIG. 44 is a front view of the latch module and reader module of FIG. 36.
Figure 45:
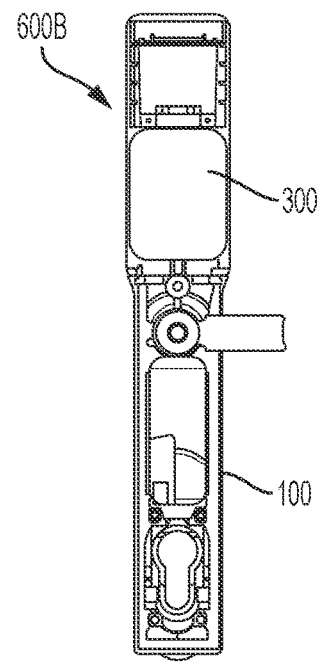
FIG. 45 is a rear view of the latch module and reader module of FIG. 36.
Figure 46:
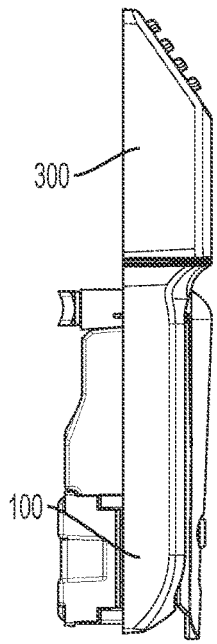
FIG. 46 is a left side view of the latch module and reader module of FIG. 36.
Figure 47:
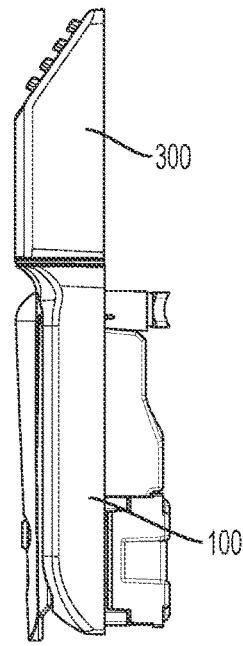
FIG. 47 is a right side view of the latch module and reader module of FIG. 36.
Figure 48:
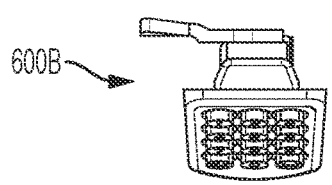
FIG. 48 is a top view of the latch module and reader module of FIG. 36.
Figure 49:
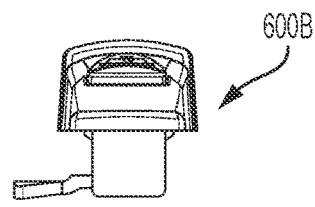
FIG. 49 is a bottom view of the latch module and reader module of FIG. 36.
Figure 50:
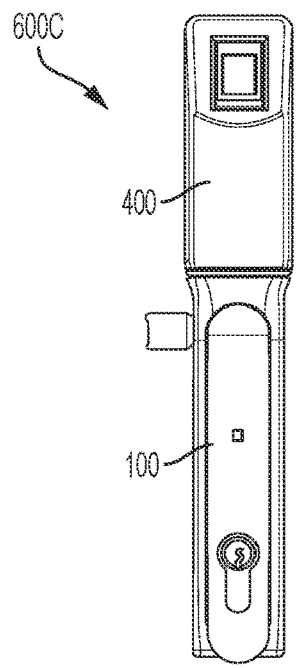
FIG. 50 is a front view of the latch module and reader module of FIG. 37.
Figure 51:
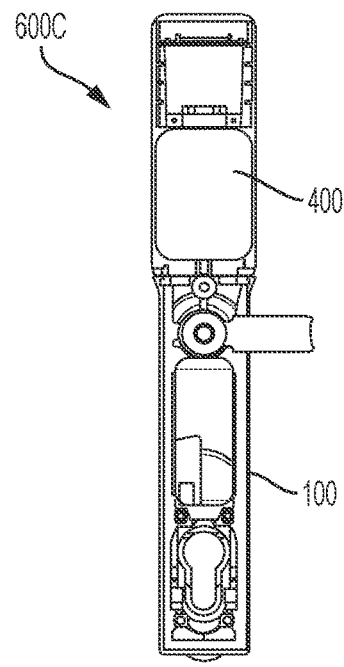
FIG. 51 is a rear view of the latch module and reader of FIG. 37.
Figure 52:
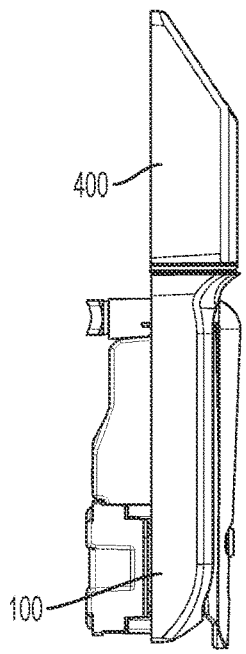
FIG. 52 is a left side view of the latch and reader module of FIG. 37.
Figure 53:
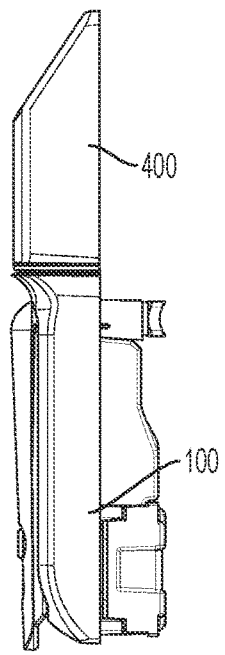
FIG. 53 is a right side view of the latch module and reader module of FIG. 37.
Figure 54:
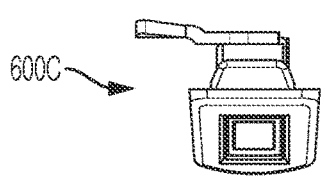
FIG. 54 is a top view of the latch module and reader module of FIG. 37.
Figure 55:
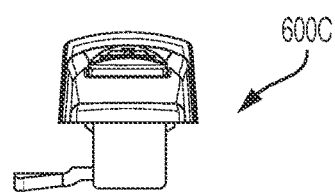
FIG. 55 is a bottom view of the latch module and reader module of FIG. 37.

In summary, reader modules 200, 300 and 400 are configured to detachably couple to latch module 100 in the same way, providing the ability to retrofit an installed latch module with any of the three reader modules. FIG. 34 schematically illustrates the interchangeability of reader modules 200, 300 and 400 on latch module 100. This interchangeability allows a user to select and use one of three possible combinations of latch modules and reader modules. FIGS. 35 and 38-43 illustrate a first assembly 600A featuring latch module 100 and reader module 200. FIGS. 36 and 44-49 illustrate a second assembly 600B featuring latch module 100 and reader module 300. FIGS. 37 and 50-55 illustrate a third assembly 600C featuring latch module 100 and reader module 400.

In addition to having detachable couplings (e.g. sliding connections or other connections that can be manually engaged and disengaged, with or without tools), reader modules and latch modules in accordance with the present disclosure can also be electronically connected in a number of ways. For example, reader modules can include one or more male plugs that plug into one or more female sockets on latch modules, or vice versa. In addition, or as an alternative, reader modules can be wired to latch modules. In the examples shown in FIGS. 34-36, reader modules 200, 300, 400 are each connectable to latch module 100 with a wire connection, as schematically represented by wires 150.

Reader modules in accordance with the present disclosure can have configurations that are different from those shown in FIGS. 35-55. Different configurations that are contemplated in the present disclosure include, but are not limited to, different types of reader couplings, readers/interfaces, light pipe assemblies, body geometries, and other aspects. Therefore, other combinations and assemblies of latch modules and reader modules are contemplated in accordance with the present disclosure.

Electronic access systems and methods in accordance with the present disclosure can be configured and customized in numerous ways. Systems and methods may be designed to control access through one or more doors, panels or closures (referred to generally as "access points"). Where a secured area has only one access point, it may be sufficient to install one latch module and one reader module. In such a case, the modularity of the latch module and reader module provides flexibility for the manner in which the modules are installed and operated. For example, the latch module and reader module can be installed at the access point in an assembled mode, as exemplified by the examples shown in FIGS. 35-37. Alternatively, the latch module can be installed by itself at the access point in a stand-alone mode, and the reader module can be installed in a separate location in a stand-alone mode. In either scenario, the latch module and reader module are both in electronic communication with a controller and can perform their respective functions.

Where there is more than one access point, it may necessary to install a latch module and reader module at each access point. Alternatively, it may be sufficient to install a latch module and reader module together at only one of the access points, and install latch modules in stand-alone modes without reader modules at the remaining access points. In the latter scenario, user input received from the reader module can be used to unlock all of the latch modules.

Figure 56:
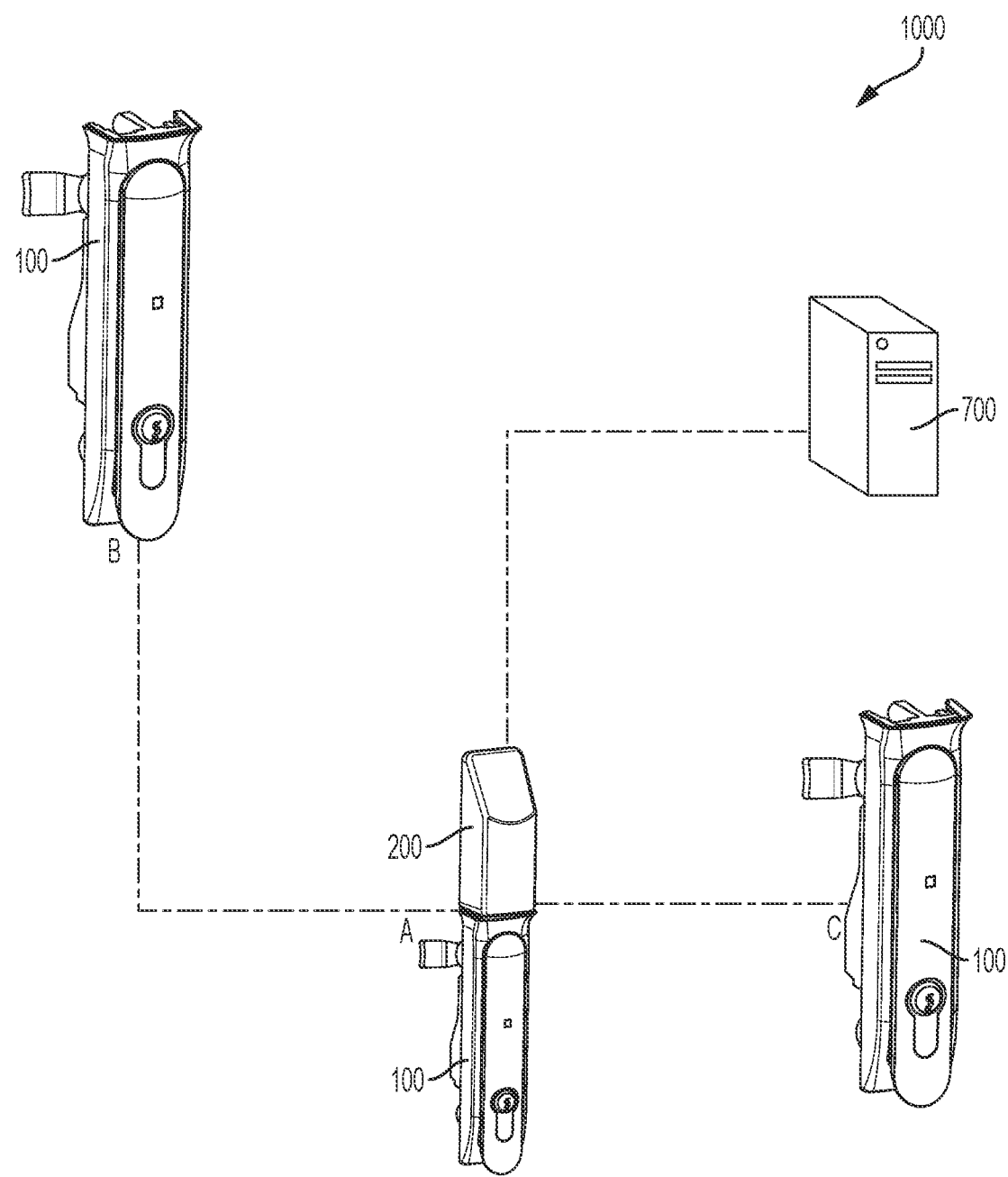
FIG. 56 is schematic view of an electronic access system in accordance with one exemplary embodiment of the present disclosure.

FIG. 56 illustrates one possible system 1000 in accordance with the present disclosure. System 1000 is installed in a secured area that has three access points A, B and C. A latch module 100 is installed at each of access points A, B and C. A reader module 200 is also installed, but only at access point A. Reader module 200 is operable to receive data from a user's RFID tag or transponder, and send a signal to a controller 700. Controller 700 can be implemented in the form of a computer processor, including but not limited to a desktop computer with software programmed to read data from the reader and send instructions to one or more latch modules. If the RFID tag or transponder is approved, controller 700 sends a signal to unlock each of the latch modules 100 at access points A, B and C. Components of systems in accordance with the present disclosure can be networked and communicate in a variety of ways. In the present example, controller 700 sends an output signal to reader module 200, which in turn sends signals to each latch module 100 with instructions to unlock.

Latch modules and reader modules shown and described herein have a number of aesthetic and ornamental features that are not dictated by function or purpose. These aesthetic and ornamental features, which can be varied and changed without affecting the function or purpose of the latch modules and reader modules, include but are not limited to, the shape, color, surface texture, relative dimensions, opacity, transparency, translucency, and light intensity, where applicable, of the latch module alone, the reader module alone, the latch module and reader module when assembled, the light pipe, the ends of the lever on the latch module, the exterior taper of the latch module immediately beneath the light pipe, the top face and sidewalls of the reader module, the position of the light pipe on the reader module, and the position of the light pipe relative to the latch module.

While specific embodiments of the invention have been shown and described herein, it will be understood that such embodiments are provided by way of example only. Numerous variations, changes and substitutions will occur to those skilled in the art without departing from the present disclosure. Accordingly, it is intended that the appended claims cover all such variations, and that all such variations fall within the scope of the present disclosure.

What is claimed:

1. A modular latch system for use in an electronic access system to provide controlled access to a secure area, the modular latch system comprising:
   a reader operable to communicate electronically with a controller of the electronic assess system, the reader comprising at least one user interface operable to receive at least one input from a user, and to communicate the at least one input to the controller; and
   a latch separate from and independently operable with respect to the reader, the latch being configured for mounting to a closure that provides access to the secure area, and the latch being configured to be releasably engaged to the reader, the latch including a moveable handle and a pawl that is rotatable about an axis between a locked position and an unlocked position;
   wherein the modular latch system is configured for releasable engagement of the reader to the latch, disengagement of the reader from the latch, and releasable engagement of an alternate reader to the latch for retrofit of the reader with the alternate reader, wherein the reader is configured to be engaged and disengaged to/from the latch by translating the reader with respect to the latch along the axis.

2. The modular latch system of claim 1, wherein the latch is operable in a locked mode to lock the closure and prevent access to the secure area, and an unlocked mode to unlock the closure and allow access to the secure area.

3. The modular latch system of claim 1, wherein the latch is operable to receive an instruction from the controller and move the latch to one of the locked mode and the unlocked mode in response to the instruction.

4. The modular latch system of claim 1, wherein the reader comprises a reader coupling and the latch comprises a latch coupling that is detachably connectable to the reader coupling.

5. The modular latch system of claim 4, wherein the reader comprises a cap that is detachably connectable to the reader coupling.

6. The modular latch system of claim 5, wherein the cap slidingly engages the reader coupling.

7. The modular latch system of claim 4, wherein the handle includes a housing portion and a handle portion connected to the housing portion.

8. The modular latch system of claim 7, wherein the housing portion defines the latch coupling.

9. The modular latch system of claim 4, wherein the latch coupling comprises longitudinal channels and the reader coupling comprises a plurality of rails configured to slidably engage with the channels of the latch coupling.

10. The modular latch system of claim 9, wherein the latch coupling is detachably connectable to the reader coupling by aligning the reader coupling and the latch coupling along the axis.

11. The modular latch system of claim 1, wherein the at least one user interface is selected from the group consisting of an RFID reader, a keypad and a biometric sensor.

12. The modular latch system of claim 1, wherein the at least one user interface comprises an RFID reader and a keypad.

13. The modular latch system of claim 1, wherein the at least one user interface comprises an RFID reader and a biometric sensor.

14. The modular latch system of claim 1, further comprising a light source operable to emit light in response to an instruction from the controller.

15. The modular latch system of claim 1, wherein the reader is interchangeable with the alternate reader, and the alternate reader is operable to communicate electronically with the controller, the alternate reader comprising at least one alternate user interface, the at least one alternate user interface being different from the at least one user interface.

16. A light pipe for the modular latch assembly of claim 1, the light pipe having a body comprising:
a main body portion; and
an extension extending from the main body portion,
the extension comprising an inlet end for receiving light from a light source and transmitting the light through the extension to the main body portion.

17. An electronic access system for providing controlled access to a secure area, the electronic access system comprising:
a controller; and
a modular latch system, the modular latch system comprising:
a reader operable to communicate electronically with a controller of the electronic assess system, the reader comprising at least one user interface operable to receive at least one input from a user, and to communicate the at least one input to the controller; and
a latch separate from and independently operable with respect to the reader, the latch being configured for mounting to a closure that provides access to the secure area, and the latch being configured to be releasably engaged to the reader, the latch including a moveable handle and a pawl that is rotatable about an axis between a locked position and an unlocked position;
wherein the modular latch system is configured for engagement of the reader to the latch, disengagement of the reader from the latch, and engagement of an alternate reader to the latch for retrofit of the reader with the alternate reader, and wherein the reader is configured to be engaged and disengaged to/from the latch by translating the reader with respect to the latch along the axis.

18. The electronic access system of claim 17, wherein the latch is operable in a locked mode to lock the closure and prevent access to the secure area, and an unlocked mode to unlock the closure and allow access to the secure area.

19. The electronic access system of claim 18, wherein the latch is operable to receive an instruction from the controller and move the latch to one of the locked mode and the unlocked mode in response to the instruction.

20. The electronic access system of claim 17, wherein the reader comprises a reader coupling and the latch comprises a latch coupling that is detachably connectable to the reader coupling.

21. The electronic access system of claim 20, wherein the reader comprises a cap that is detachably connectable to the reader coupling.

22. The electronic access system of claim 17, wherein the at least one user interface is selected from the group consisting of an RFID reader, a keypad and a biometric sensor.

23. The electronic access system of claim 17, wherein the at least one user interface comprises an RFID reader and a keypad.

24. The electronic access system of claim 17, wherein the at least one user interface comprises an RFID reader and a biometric sensor.

25. The electronic access system of claim 24, wherein the handle includes a housing portion and a handle portion connected to the housing portion.

26. The electronic access system of claim 25, wherein the housing portion defines the latch coupling.

27. The electronic access system of claim 17, further comprising a light source operable to emit light in response to an instruction from the controller.

28. The electronic access system of claim 17, wherein the reader is interchangeable with the alternate reader, and the alternate reader is operable to communicate electronically with the controller, the alternate reader comprising at least one alternate user interface, the at least one alternate user interface being different from the at least one user interface.

29. A latch for use with a reader in an electronic access system to provide controlled access to a secure area, the latch comprising:
a housing; and
a latch coupling associated with the housing and detachably connectable to a reader coupling of the reader or to a cap;
wherein the latch is configured for engagement to the reader or the cap, disengagement from the reader or the cap, and engagement to an alternate reader for retrofit of the reader or the cap with the alternate reader; and
wherein the latch further comprises a moveable handle and a pawl that is rotatable about an axis between a locked position and an unlocked position; and
wherein the latch is configured to be engaged and disengaged to/from the reader by translating the reader with respect to the latch along the axis.

30. The latch of claim 29, wherein the latch is operable in a locked mode to lock the closure and prevent access to the secure area, and an unlocked mode to unlock the closure and allow access to the secure area.

31. The latch of claim 29, wherein the latch is operable to receive an instruction from the controller and move the latch to one of the locked mode and the unlocked mode in response to the instruction.

32. The latch of claim 29 wherein the handle comprises a housing portion and a handle portion connected to the housing portion.

33. The latch of claim 32, wherein the housing portion defines the latch coupling.

34. The latch of claim 29, further comprising a light source operable to emit light in response to an instruction from a controller in the electronic access system.

35. A reader for use with a latch, which has a movable handle and a pawl that is rotatable about an axis between a locked position and an unlocked position, in an electronic access system to provide controlled access to a secure area, the reader comprising:

a housing; and a reader coupling associated with the housing and detachably connectable to a latch coupling of the latch or to a cap;

wherein the reader is configured for engagement to the latch or the cap, disengagement from the latch or the cap, and engagement to an alternate latch for retrofit of the latch or the cap with the alternate latch;

wherein the reader is configured to be engaged and disengaged to/from the latch by translating the reader with respect to the latch along the axis.

36. The reader of claim 35, wherein the reader is operable to communicate electronically with a controller of the electronic assess system, the reader comprising at least one user interface operable to receive at least one input from a user, and to communicate the at least one input to the controller.

37. The reader of claim 36, wherein the at least one user interface is selected from the group consisting of an RFID reader, a keypad and a biometric sensor.

38. The reader of claim 36, wherein the at least one user interface comprises an RFID reader and a keypad.

39. The reader of claim 36, wherein the at least one user interface comprises an RFID reader and a biometric sensor.

40. A method for retrofitting an electronic access system from a user interface to an alternate user interface, the method comprising the steps of:

disengaging a reader of the electronic access system from a latch of the electronic access system that is releasably engaged to the reader such that the reader and the latch are disengaged from one another, wherein the latch includes a moveable handle and a pawl that is rotatable about an axis between a locked position and an unlocked position, and wherein the reader is disengaged from the latch by translating the reader with respect to the latch along the axis; and engaging an alternative reader having the alternate user interface to the latch of the electronic access system such that the alternative reader and thereby the latch are releasably engaged to one another, thereby retrofitting the electronic access system from the user interface to the alternate user interface.

41. The method for retrofitting an electronic access system of claim 40, further comprising the step of engaging the reader of the electronic access system having the user interface to the latch of the electronic access system, wherein the reader comprises a reader coupling associated with the reader that is engaged to a latch coupling associated with the latch.

42. The method for retrofitting an electronic access system of claim 41, wherein the reader coupling is slidably engaged with the latch coupling.

43. The method for retrofitting an electronic access system of claim 40, wherein the step of disengaging the reader of the electronic access system from the latch of the electronic access system comprises disengaging a reader coupling associated with the reader from a latch coupling associated with the latch.

44. The method for retrofitting an electronic access system of claim 43, wherein the reader coupling is slidably disengaged from the latch coupling.

* * * * *